United States Patent
Jin et al.

(10) Patent No.: US 9,008,349 B2
(45) Date of Patent: Apr. 14, 2015

(54) SPEAKER DIAPHRAGM, SPEAKER, AND ELECTRONIC EQUIPMENT AND MOBILE DEVICE USING THE SPEAKER

(75) Inventors: Yohei Jin, Mie (JP); Yoshimichi Kajihara, Mie (JP); Shinya Mizone, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 720 days.

(21) Appl. No.: 12/866,928

(22) PCT Filed: Jul. 6, 2009

(86) PCT No.: PCT/JP2009/003121
§ 371 (c)(1),
(2), (4) Date: Aug. 10, 2010

(87) PCT Pub. No.: WO2010/004717
PCT Pub. Date: Jan. 14, 2010

(65) Prior Publication Data
US 2011/0007922 A1    Jan. 13, 2011

(30) Foreign Application Priority Data
Jul. 7, 2008    (JP) ................................. 2008-176545

(51) Int. Cl.
*H04R 1/02* (2006.01)
*H04R 7/12* (2006.01)
*C08L 67/04* (2006.01)
*C08L 97/02* (2006.01)
*H04R 31/00* (2006.01)
(Continued)

(52) U.S. Cl.
CPC .............. *H04R 7/12* (2013.01); *B29C 45/0005* (2013.01); *B29L 2031/3418* (2013.01); *C08L 3/02* (2013.01); *C08L 67/04* (2013.01); *C08L 97/02* (2013.01); *C08L 2205/16* (2013.01); *H04R 31/003* (2013.01); *H04R 2231/001* (2013.01); *H04R 2307/021* (2013.01); *H04R 2307/025* (2013.01); *H04R 2307/029* (2013.01); *H04R 2499/11* (2013.01); *H04R 2499/13* (2013.01)

(58) Field of Classification Search
USPC .................... 381/345, 190, 428; 523/223, 523
See application file for complete search history.

(56) References Cited

U.S. PATENT DOCUMENTS 5,274,199 A    12/1993    Uryu et al.
5,875,253 A     2/1999    Okazaki et al.
(Continued)

FOREIGN PATENT DOCUMENTS

CN    1116397 A      2/1996
JP    04-023597 A    1/1992
(Continued)

OTHER PUBLICATIONS

International Search Report for Application No. PCT/JP2009/003121, Aug. 4, 2009, Panasonic Corporation.
(Continued)

*Primary Examiner* — Duc Nguyen
*Assistant Examiner* — Phan Le
(74) *Attorney, Agent, or Firm* — RatnerPrestia

(57) ABSTRACT

A speaker diaphragm of the present invention is formed by mixing polylactic acid as a plant-derived resin, bamboo fibers and a natural binder. It is thereby possible to realize a speaker diaphragm capable of obtaining sufficient sound velocity, while having low environmental load and high sound quality.

19 Claims, 3 Drawing Sheets

(51) Int. Cl.
    *B29C 45/00*       (2006.01)
    *B29L 31/34*       (2006.01)
    *C08L 3/02*        (2006.01)

(56) References Cited

U.S. PATENT DOCUMENTS

| | | | |
|---|---|---|---|
| 5,903,658 A | 5/1999 | Okazaki et al. | |
| 6,235,825 B1* | 5/2001 | Yoshida et al. | 524/314 |
| 8,199,964 B2 | 6/2012 | Mimura et al. | |
| 2004/0096623 A1* | 5/2004 | Hashiba et al. | 428/114 |
| 2005/0067730 A1* | 3/2005 | Yano et al. | 264/109 |
| 2005/0154148 A1* | 7/2005 | Nakamichi et al. | 525/450 |
| 2005/0211402 A1 | 9/2005 | Uryu et al. | |
| 2005/0234153 A1* | 10/2005 | Itabashi | 524/13 |
| 2007/0131478 A1* | 6/2007 | Okazaki et al. | 181/167 |
| 2008/0027158 A1* | 1/2008 | Ishida et al. | 523/223 |
| 2008/0260188 A1* | 10/2008 | Kim | 381/190 |
| 2009/0080687 A1 | 3/2009 | Mimura et al. | |
| 2009/0275678 A1* | 11/2009 | Kumazawa et al. | 523/523 |

FOREIGN PATENT DOCUMENTS

| | | |
|---|---|---|
| JP | 2000-160034 A | 6/2000 |
| JP | 2000-324591 A | 11/2000 |
| JP | 2001-303478 A | 10/2001 |
| JP | 2003-055871 A | 2/2003 |
| JP | 2003-055871 A | 2/2003 |
| JP | 2004-35705 A | 2/2004 |
| JP | 2005-236497 A | 9/2005 |
| JP | 2005-260546 A | 9/2005 |
| JP | 2005-260546 A | 9/2005 |
| JP | 2005-269427 A | 9/2005 |
| JP | 2005260546 A * | 9/2005 |
| JP | 2005-298704 A | 10/2005 |
| JP | 2006-117768 A | 5/2006 |
| JP | 2007-221635 A | 8/2007 |
| JP | 2007-295110 A | 11/2007 |
| JP | 2007-295239 A | 11/2007 |
| JP | 2008-124962 A | 5/2008 |
| JP | 2008-124962 A | 5/2008 |
| JP | 2008-153924 A | 7/2008 |
| JP | 2008-253923 A | 7/2008 |
| WO | WO 2007/097206 A1 | 8/2007 |

OTHER PUBLICATIONS

Japanese Office Action for Application No. 2008-176545 dated Dec. 18, 2012.
CN Office Action for 200980110503.1, May 6, 2013.
JP Office Action for 2008-176545, Jun. 11, 2013.

* cited by examiner

SPEAKER DIAPHRAGM, SPEAKER, AND ELECTRONIC EQUIPMENT AND MOBILE DEVICE USING THE SPEAKER

This application is a U.S. national phase application of PCT International Application PCT/W2009/003121.

TECHNICAL FIELD

The present invention relates to a speaker diaphragm for use in a variety of acoustic equipment or video equipment, a speaker using this diaphragm, electronic equipment such as an audio set and a television set, and a mobile device using this diaphragm.

BACKGROUND ART

Generally, polylactic acid as a plant-derived resin has a high specific gravity and practically has difficulty in obtaining a sufficient sound velocity of not lower than 1800 m/s, and hence the polylactic acid has not been used for a speaker diaphragm. As a material characteristic required for the speaker diaphragm, a sound velocity C (m/s) is often used. Using a Young's modulus E and a density $\rho$ as important characteristics for the diaphragm, a calculating formula for determining the sound velocity C can be expressed by: $C=(E/\rho)^{0.5}$. In other words, when a material is hard and lightweight (or has large rigidity and low density) as being ideal conditions for the diaphragm material, a value of the sound velocity C is large, and that is more ideal.

There is generally a correlation between the sound velocity C and a high limit frequency of the speaker, in which the speaker is required to reproduce sound up to about 20 kHz as an audible frequency threshold for humans, and for satisfying this requirement, the sound velocity C is required to be not lower than 1800 m/s.

With recent petrochemistry-free trends, a speaker diaphragm, formed by mixing kenaf fibers into polylactic acid as a plant-derived resin to improve sound velocity, has been studied. In the case of mixing the kenaf fibers into the polylactic acid as the plant-derived resin, the diaphragm becomes apt to break when a wt % of the kenaf fibers exceeds a certain percentage of a total wt %. Moreover, in the case of further mixing a binder for the purpose of increasing compatibility of the mixed material to improve the sound velocity, an appropriate kind and a weight ratio of the binder vary depending upon a kind and mixed ratios of the material into which the binder is mixed. Therefore, mixing the binder may just lower the sound velocity, and it has been difficult to select an appropriate binder in accordance with a material into which the binder is mixed.

As for document information on these prior arts, for example, Patent Document 1 is known.

PRIOR ART DOCUMENT

Patent Document

[Patent Document 1] Unexamined Japanese Patent Publication No. 2005-260546

DISCLOSURE OF THE INVENTION

A speaker diaphragm of the present invention is formed by injection-molding a material obtained by compounding polylactic acid, bamboo fibers, and a natural binder.

Further, a speaker of the present invention is provided with a magnetic circuit, a frame, a diaphragm, and a voice coil, and the diaphragm is made up of polylactic acid, bamboo fibers, and a natural binder.

With the above configuration, the polylactic acid and the bamboo fibers have improved compatibility, becoming apt to bond to each other and having improved rigidity. It is thereby possible to obtain a speaker diaphragm with practically sufficient sound velocity, while reducing environmental load.

PREFERRED EMBODIMENTS FOR CARRYING OUT OF THE INVENTION

Embodiments of the present invention are described below with reference to the drawings.

Embodiment 1

Figure 1:
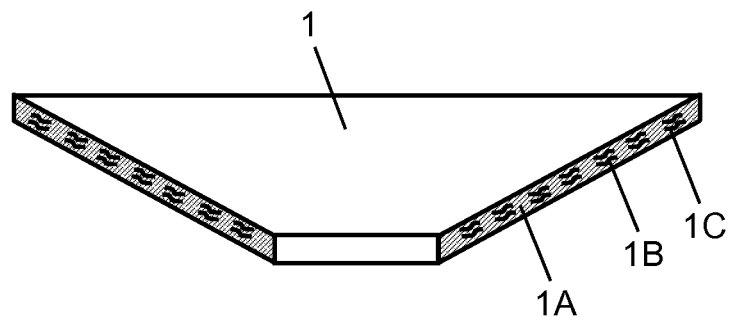
FIG. 1 is a sectional view of a speaker diaphragm in Embodiment 1 of the present invention.
Figure 2:
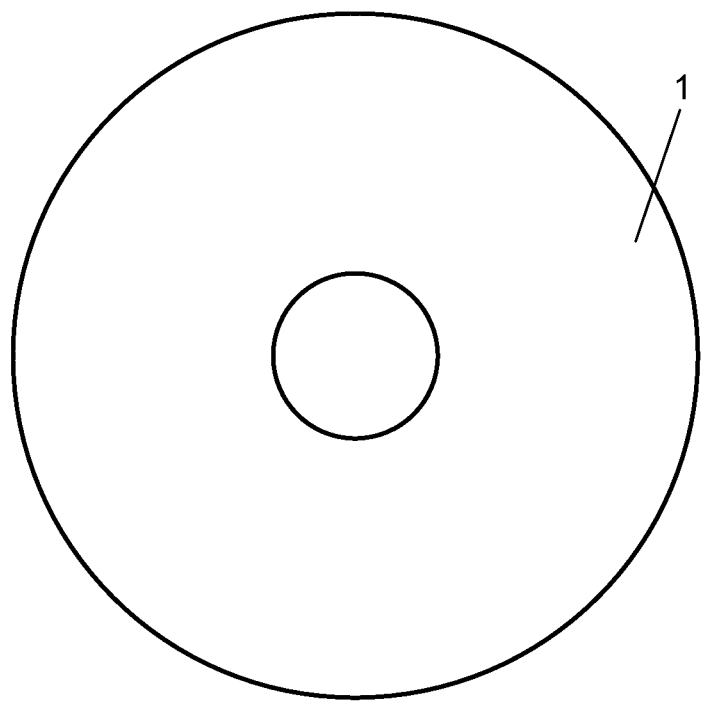
FIG. 2 is a plan view of the speaker diaphragm in Embodiment 1 of the present invention.
Figure 3:
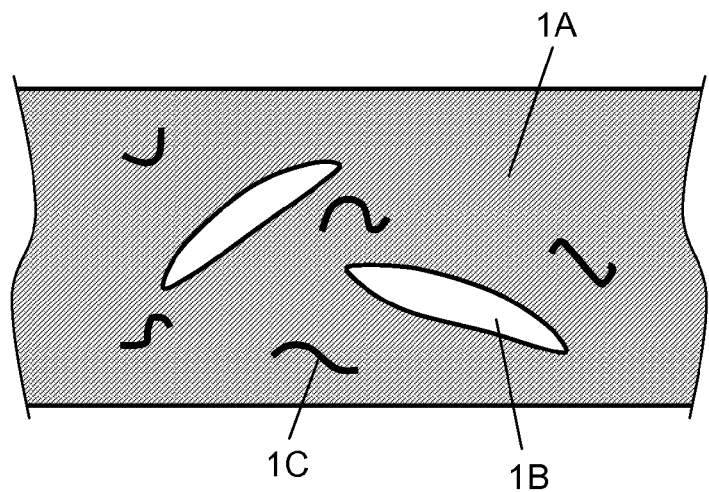
FIG. 3 is an expanded sectional view of the speaker diaphragm in Embodiment 1 of the present invention.

FIG. 1 is a sectional view of a speaker diaphragm in Embodiment 1 of the present invention. FIG. 2 is a plan view of the speaker diaphragm in Embodiment 1 of the present invention. FIG. 3 is an expanded sectional view of the speaker diaphragm in Embodiment 1 of the present invention.

In FIGS. 1 to 3, diaphragm 1 is formed using polylactic acid 1A as a base resin. A material obtained by uniformly dispersing bamboo fibers 1B and binder 1C in polylactic acid 1A is injection-molded, to constitute diaphragm 1.

Polylactic acid 1A is made up of a plant raw material. Specifically, polylactic acid 1 is made up of a polymer formed by polymerizing and synthesizing L-lactic acid as a monomer, which is obtained by fermentation of starch extracted from a plant such as corn, potatoes, beat or sugarcane. Polylactic acid 1A possesses characteristics of having a high flexural modulus, but having low impact resistance and heat resistance.

A first reason for the use of bamboo fibers 1B is that, since having both hardness and flexibility, bamboo fibers 1B have an effect of improving an elastic modulus, and an effect of improving an internal loss.

A second reason for the use of bamboo fibers 1B is that, since also having a large deodorization effect and having no odor specific to plants, bamboo fibers 1B can be extensively used in an in-car speaker and an interior audio set.

A third reason for the use of bamboo fibers 1B is that it not only has an effect of adjusting material properties for the sake of improvement in sound quality, but also increases a degree of plant, to allow reduction in environmental load. The degree of plant mentioned here indicates a wt % of a material made of a plant raw material, meaning a total wt % of polylactic acid 1A, bamboo fibers 1B, and binder 1C contained in diaphragm 1. With increase in degree of plant, the diaphragm becomes less apt to newly generate carbon dioxide when being burnt and discarded. It is possible to emit originally held carbon dioxide so as to reduce a net amount of carbon dioxide emission, thereby reducing the environmental load.

A fiber length of bamboo fibers 1B is desirably not smaller than 0.2 mm and not larger than 5 mm. When the fiber length of bamboo fibers 1B is smaller than 0.2 mm, the effect of bamboo fibers 1B cannot be efficiently exerted, to cause a decrease in high elastic modulus. Further, when the fiber length of bamboo fibers 1B is larger than 5 mm, the exterior of diaphragm 1 is impaired at a time of diaphragm 1 being made thin. Accordingly, in order to obtain diaphragm 1 with high performance and high quality, it is preferable to select the length of bamboo fibers 1B being not smaller than 0.2 mm and not larger than 5 mm.

Moreover, a weight of bamboo fibers 1B in a total weight of diaphragm 1 is desirably not smaller than 5 wt % and not larger than 55 wt %, and more desirably not smaller than 10 wt % and not larger than 30 wt %.

When the weight of bamboo fibers 1B is smaller than 5 wt % of the total weight of diaphragm 1, the foregoing effects by the use of bamboo fibers 1B do not significantly appear. Further, when the weight of bamboo fibers 1B is larger than 55 wt % of the total weight of diaphragm 1, it is difficult to uniformly disperse bamboo fibers 1B into polylactic acid 1A as the base resin.

Especially when the weight of bamboo fibers 1B is not smaller than 30 wt % of the total weight of diaphragm 1, it is difficult to obtain diaphragm 1 with a face thickness of not larger than 0.3 mm by injection-molding due to low flowability of polylactic acid 1A as the base resin.

Moreover, it is more preferable that bamboo fibers 1B further contain bamboo fibers having been made finer into a microfibrillated state with an average fiber diameter of not larger than 10 μm. The entanglement of bamboo fibers 1B is strengthened by making bamboo fibers 1B, having been made finer into the microfibrillated state, contained in diaphragm 1, and hence the strength is improved. Therefore, the elastic modulus is also improved, to make higher sound quality realizable.

In general, fibers with an aspect ratio (L/D), which is a ratio of a fiber length L and a fiber diameter D, being large have high elasticity, and bamboo fibers 1B, having been made finer into the microfibrillated state, have a large aspect ratio and can thus be expected to have a high elastic modulus. Moreover, partially making bamboo fibers 1B, having been made finer into the microfibrillated state, contained in diaphragm 1 also produces an effect of strengthening the bond among bamboo fibers 1B, and those mentioned above synergize to make the elastic modulus high.

Further, in a case of wishing to make a tone color more natural and brighter by increasing bamboo fibers 1B contained in diaphragm 1, a bamboo powder may be used for part or the whole of bamboo fibers 1B. The use of the bamboo powder alleviates the foregoing disadvantage of the case where the weight of bamboo fibers 1B contained in diaphragm 1 exceeds 30 wt %. When a total weight of non-powdery bamboo fibers 1B and the bamboo powder is not larger than 55 wt % of the total weight of diaphragm 1, diaphragm 1 can be formed by injection-molding with ease.

Furthermore, since the degree of plant of the material increases, diaphragm 1 with lower environmental load can be obtained. The "degree of plant" mentioned here indicates a total wt % of a plant-raw-material resin produced from corn or the like, and plant fibers such as bamboo fibers 1B, and is used as an index of how an amount of carbon dioxide emission as greenhouse gases can be reduced without using an oil-derived material.

Moreover, adding a carbonized material can further improve the elastic modulus. Especially, the use of bamboo charcoal can increase the elastic modulus without lowering the degree of plant. In addition, the bamboo charcoal usually serves as carbon-based pigments in use for blackish diaphragm 1, and can give a high-quality exterior as well as having the effect of improving the sound quality.

Here, the bamboo charcoal indicates a granular material obtained by previously cutting a bamboo material into an appropriate size, followed by carbonization at a high temperature of about 80° C. and crushing.

Binder 1C is made up of a natural binder. The natural binder is a binder manufactured from a naturally derived raw material, as well as a binder which is biodegradable when buried in the ground and is environmentally friendly. The natural binder is used because it is a natural material as are polylactic acid 1A made of the plant raw material being adherend and bamboo fibers 1B, thereby having good affinity, dispersibility and compatibility with polylactic acid 1A and bamboo fibers 1B. For this reason, at the time of bonding to polylactic acid 1A and bamboo fibers 1B, interactions with those are expected to occur, and strong attachment is obtained. Hence the natural binder has excellent fixing properties to bamboo fibers 1B.

Among the natural binders, a starch-based binder is particularly appropriate as binder 1C used in the present example. The starch-based binder is a granular or powdery material, having thermoplasticity. A glass transition temperature of the starch-based binder is 85° C. to 130° C.

The starch-based binder means a binder made up of raw starch, chemically denatured starch, or physically denatured starch. The starch is made up of at least one of potato, corn, wheat, tapioca and the like. Specifically, the starch-based binder constituting binder 1C is made up of at least one or more of oxidized starch, cationized starch, phosphoesterified starch, ethernized starch, potato starch, tapioca starch, wheat starch, and corn starch.

The weight of starch-based binder 1C with respect to the total weight of diaphragm 1 is desirably not smaller than 0.5 wt % and not larger than 20 wt %. When the weight of starch-based binder 1C is smaller than 0.5 wt %, binder 1C resists adhesion to polylactic acid 1A and bamboo fibers 1B even with the use of starch-based binder 1C. Further, when the weight of starch-based binder 1C is larger than 20 wt %, a solidified portion is generated, to prevent uniform dispersion of the mixture of polylactic acid 1A and bamboo fibers 1B.

An example of the present invention and a comparative example are described below.

EXAMPLE

Polylactic acid 1A, bamboo fibers 1B, and binder 1C are melted and mixed at a compounding ratio of 80 wt % of polylactic acid 1A, 15 wt % of bamboo fibers 1B, and 5 wt % of binder 1C, to produce a resin pellet. The resin pellet is injection-molded at a molding temperature of 200° C., to give speaker diaphragm 1 with a diameter of 16 cm. When a specific gravity of this diaphragm 1 is measured, it is found to be about 1.15. When a sample with a size of 32×5 mm as part of diaphragm 1 is extracted and sound velocity is measured, the sound velocity is found to be about 2000 m/s.

Moreover, a content of bamboo fibers 1B is 10 wt % to 30 wt %, a content of starch-based binder is 1 wt % to 10 wt %, and a content of polylactic acid 1A is regarded as a remaining compounding ratio. Here, the remaining compounding ratio is within the range of 60 wt % to 89 wt %, obtained by subtracting a wt % as the content of bamboo fibers 1B and a wt % as the content of binder 1C from 100 wt % as the total weight. In this case, the specific gravity of diaphragm 1 is within the range of not smaller than 1.10 and not larger than 1.18, and the sound velocity of diaphragm 1 is not lower than 1800 m/s that is considered to be practically sufficient.

Comparative Example

Speaker diaphragm 1, which contains oil-derived polypropylene and obtains sufficient sound velocity due to polypropylene, is shown as a comparative example.

In this case, at a composition of 25 wt % of polylactic acid 1A, 25 wt % of bamboo fibers 1B, 5 wt % of starch-based binder 1C and 45 wt % of polypropylene, melting and mixing are performed, to produce a resin pellet. The resin pellet is injection-molded at a molding temperature of 200° C., to give speaker diaphragm 1 with a diameter of 16 cm. When a specific gravity of this diaphragm 1 is measured, it is found to be about 1.16. When a sample with a size of 32×5 mm as part of diaphragm 1 is extracted and sound velocity is measured, the sound velocity is found to be about 1900 m/s.

It is found from the above that diaphragm 1 of example has a high degree of plant to reduce the environmental load, and furthermore shows a sufficient sound velocity of not lower than 1800 m/s, almost equivalent to oil-derived diaphragm 1 of Comparative Example.

As thus described, in the present invention, a material obtained by compounding polylactic acid as a plant raw material, bamboo fibers, and a natural binder is injection-molded, to form a speaker diaphragm. This improves the compatibility of the polylactic acid as the plant-derived resin and the bamboo fibers, to make the bonding therebetween easier and increase the rigidity, and it is thereby possible to obtain a diaphragm with practically sufficient sound velocity. Further, it is possible to obtain a speaker diaphragm with high sound quality and low environmental load.

Embodiment 2

Figure 4:
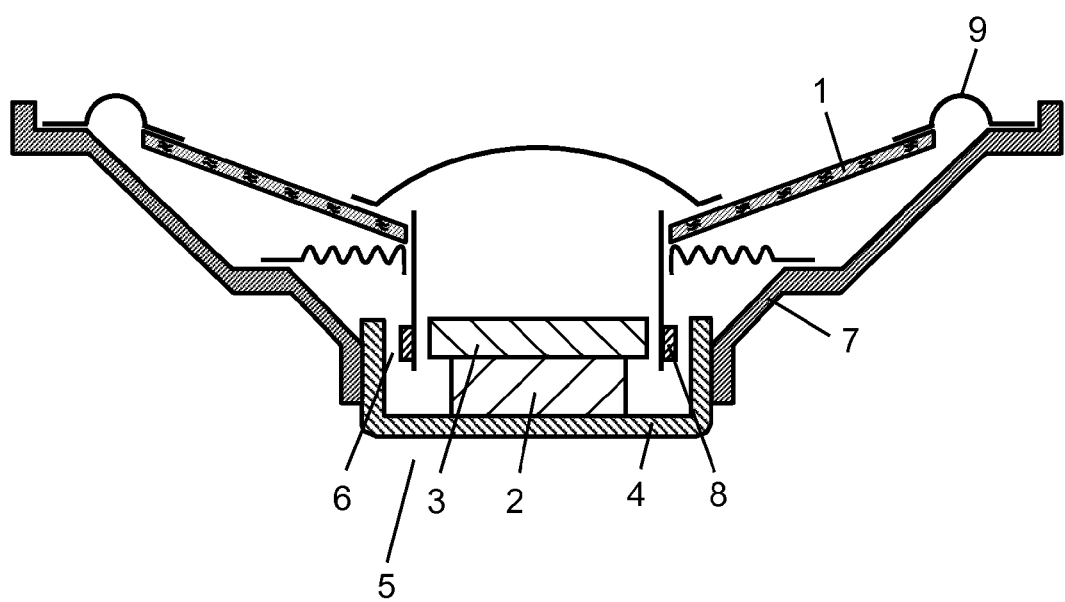
FIG. 4 is a sectional view of a speaker in Embodiment 2 of the present invention.

A speaker in Embodiment 2 of the present invention is described below with reference to FIG. 4. FIG. 4 is a sectional view of a speaker in Embodiment 2 of the present invention. It is to be noted that a description of a similar configuration to that in Embodiment 1 is omitted.

In FIG. 4, internal magnet-type magnetic circuit 5 is configured by sandwiching polarized magnet 2 between upper plate 3 and yoke 4. Frame 7 is coupled to yoke 4 of magnetic circuit 5. An outer periphery of diaphragm 1 is attached to an outer peripheral portion of frame 7 by way of edge 9. Diaphragm 1 is made up of polylactic acid, bamboo fibers, and a natural binder.

The speaker is configured such that one end of voice coil 8 is coupled to a central part of diaphragm 1, while the other end is coupled so as to fit into magnetic gap 6 formed by magnetic circuit 5.

With the above configuration, it is possible to realize a speaker with high sound quality, having the diaphragm with low environmental load and sufficient sound velocity.

Although the speaker having internal magnet-type magnetic circuit 5 is described in Embodiment 2, the present invention is not limited thereto, and may be applied to a speaker having an external magnet-type magnetic circuit.

Embodiment 3

Figure 5:
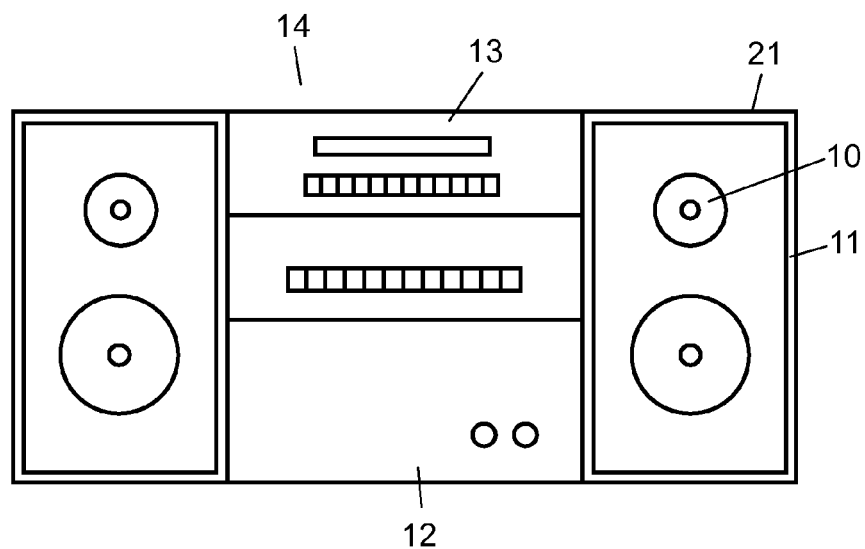
FIG. 5 is an external view of audio electronic equipment in Embodiment 3 of the present invention.

Electronic equipment in Embodiment 3 of the present invention is described with reference to FIG. 5. FIG. 5 is an external view of audio electronic equipment in Embodiment 3 of the present invention. It is to be noted that a description of similar configurations to those in respective Embodiments described above is omitted.

In FIG. 5, speaker 10 is incorporated into enclosure 11, to constitute speaker system 21. Diaphragm 1 of speaker 10 is made up of polylactic acid, bamboo fibers, and a natural binder. Amplifier 12 includes an amplifier circuit of an electric signal to be inputted into speaker system 21. Operating part 13 such as a player outputs a source to be inputted into amplifier 12. Audio electronic equipment 14 has amplifier 12, operating part 13, and speaker system 21. Amplifier 12, operating part 13, and enclosure 11 serve as a body section of audio electronic equipment 14. That is, speaker 10 is mounted to the body section of audio electronic equipment 14. Further, voice coil 8 of speaker 10 is driven by amplifier 12 in the body section, and diaphragm 1 produces sound. With this configuration, it is possible to obtain audio electronic equipment 14 with low environmental load, high sound quality, and high grade, which has hitherto been unrealizable.

It should be noted that, although floor-mounted audio electronic equipment 14 is described as an application of speaker 10 to equipment, the present invention is not limited thereto. It is also applicable to portable audio equipment, game equipment and the like, which can be carried. Further, the present invention is broadly applicable and deployable to video equipment such as a liquid crystal television and a plasma display television, information communication equipment such as a cellular telephone, and electronic equipment such as computer-related equipment.

Embodiment 4

Figure 6:
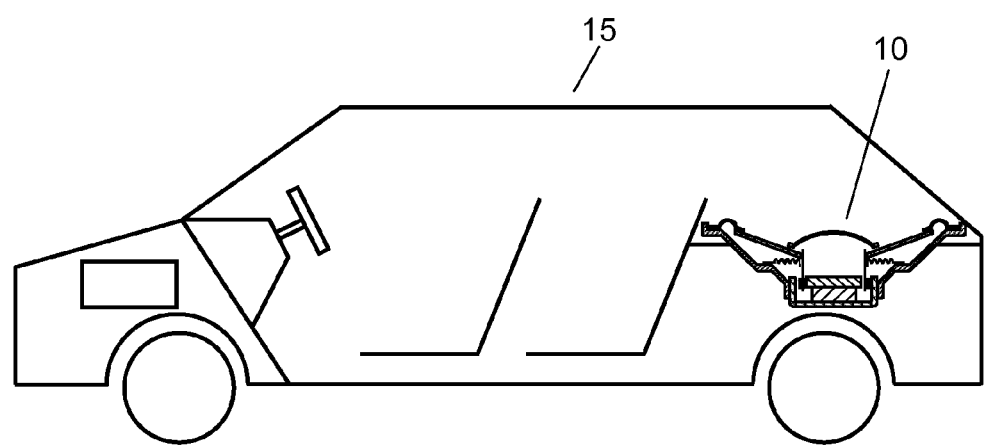
FIG. 6 is a sectional view of a mobile device in Embodiment 4 of the present invention.

A mobile device in Embodiment 4 of the present invention is described with reference to FIG. 6. FIG. 6 is a sectional view of a mobile device in Embodiment 4 of the present invention. As for the mobile device of FIG. 6, an automobile is used as a specific example. It is to be noted that a description of similar configurations to those in respective Embodiments described above is omitted.

In FIG. 6 configured is automobile 15 where speaker 10 is incorporated into a rear tray or a front panel and used as part of vocal outputs of car navigation equipment and car audio equipment. Diaphragm 1 of speaker 10 is made up of polylactic acid, bamboo fibers, and a natural binder. The car navigation equipment outputs information related to driving or the like of automobile 15 from speaker 10. The car audio equipment outputs audio signals from speaker 10.

With this configuration, the characteristics of speaker 10 are put into good use, making it possible to realize high sound quality and excellent design while reducing the environmental load, and also to the reduce environmental load of the mobile device such as the automobile which is mounted with speaker 10.

It is to be noted that in Embodiment 4, automobile 15 is described as an example of the mobile device. However, the present invention is broadly applicable to mobile devices at least provided with a mobile means and incorporated with speaker 10, such as a bike as a two-wheel vehicle and the like and a train running on rails.

Further, although the speaker diaphragm of the present invention is described by means of the example where the speaker diaphragm is formed by injection-molding, it is not limited thereto, and the formation can also be implemented by another method such as press-molding.

Industrial Applicability

A speaker diaphragm, a speaker, electronic equipment, and a mobile device of the present invention are applicable to electronic equipment such as video audio equipment and information communication equipment, and further to mobile devices such as an automobile, each of which requires a speaker that reduces environmental load and has high sound quality.

REFERENCE MARKS IN THE DRAWINGS

1 Diaphragm
1A Polylactic acid
1B Bamboo fibers
1C Binder
2 Magnet
3 Upper plate
4 Yoke
5 Magnetic circuit
6 Magnetic gap
7 Frame
8 Voice coil
9 Edge
10 Speaker
11 Enclosure
12 Amplifier
13 Operating part
14 Audio electronic equipment
15 Automobile

The invention claimed is:

1. A speaker diaphragm, comprising polylactic acid, bamboo fibers, granular bamboo charcoal which has been carbonized at a temperature of about 800° C., and a natural starch-based binder, wherein
the polylactic acid is a base resin, wherein the bamboo charcoal is blended in the resin,
a length of the bamboo fibers is not smaller than 0.2 mm and not larger than 5 mm,
a content of the bamboo fibers is 10 wt % to 30 wt %, a content of the binder is 1 wt % to 10 wt %, and a content of the polylactic acid and the granular bamboo charcoal is regarded as a remaining wt %.

2. The speaker diaphragm according to claim 1, wherein the speaker diaphragm is formed by compounding the polylactic acid, the bamboo fibers, and the natural binder, and injection-molding the compound.

3. The speaker diaphragm according to claim 1, wherein the natural binder is a starch-based binder.

4. The speaker diaphragm according to claim 1, wherein the bamboo fibers are made finer into a microfibrillated state.

5. The speaker diaphragm according to claim 1, wherein the polylactic acid, the bamboo fibers, and the natural binder are uniformly dispersed.

6. The speaker diaphragm according to claim 1, wherein a specific gravity is not lower than 1.10 and not higher than 1.18.

7. A speaker, comprising:
a magnetic circuit;
a frame, coupled to the magnetic circuit;
a diaphragm, coupled to a periphery of the frame; and
a voice coil, coupled to the diaphragm and arranged in a magnetic gap formed by the magnetic circuit,
wherein the diaphragm comprises polylactic acid, bamboo fibers, granular bamboo charcoal which has been carbonized at a temperature of about 800° C. and a natural starch-based binder, wherein
the polylactic acid is a base resin, wherein the bamboo charcoal is blended in the resin,
a length of the bamboo fibers is not smaller than 0.2 mm and not larger than 5 mm,
a content of the bamboo fibers is 10 wt % to 30 wt %, a content of the starch-based binder is 1 wt % to 10 wt %, and
a content of the polylactic acid and the granular bamboo charcoal is regarded as a remaining wt %.

8. The speaker according to claim 7, comprising a diaphragm formed by compounding the polylactic acid, the bamboo fibers, and the natural binder, and injection-molding the compound.

9. The speaker according to claim 7, wherein the natural binder is a starch-based binder.

10. The speaker according to claim 7, wherein the bamboo fibers are made finer into a microfibrillated state.

11. The speaker according to claim 7, wherein the polylactic acid, the bamboo fibers, and the natural binder are uniformly dispersed.

12. The speaker according to claim 7, wherein a specific gravity of the diaphragm is not lower than 1.10 and not higher than 1.18.

13. An electronic equipment, comprising a speaker and an amplifier circuit for driving the speaker, wherein
the speaker has a magnetic circuit; a frame, coupled to the magnetic circuit; a diaphragm, coupled to a periphery of the frame; and a voice coil, coupled to the diaphragm and arranged in a magnetic gap formed by the magnetic circuit,
the diaphragm comprises polylactic acid, bamboo fibers, granular bamboo charcoal which has been carbonized at a temperature of about 800° C. and a natural starch-based binder, wherein the polylactic acid is a base resin, and the bamboo charcoal is blended in the resin, and
a length of the bamboo fibers is not smaller than 0.2 mm and not larger than 5 mm,
a content of the bamboo fibers is 10 wt % to 30 wt %, a content of the starch-based binder is 1 wt % to 10 wt %, and a content of the polylactic acid and the granular bamboo charcoal is regarded as a remaining wt %.

14. A mobile device, comprising a speaker, an amplifier circuit for driving the speaker, and mobile means, wherein
the speaker has a magnetic circuit; a frame, coupled to the magnetic circuit; a diaphragm, coupled to a periphery of the frame; and a voice coil, coupled to the diaphragm and arranged in a magnetic gap formed by the magnetic circuit,
the diaphragm comprises polylactic acid, bamboo fibers, granular bamboo charcoal which has been carbonized at a temperature of about 800° C., and a natural starch-based binder, wherein the polylactic acid is a base resin, and the bamboo charcoal is blended in the resin, and
a length of the bamboo fibers is not smaller than 0.2 mm and not larger than 5 mm,
a content of the bamboo fibers is 10 wt % to 30 wt %, a content of the starch-based binder is 1 wt % to 10 wt %, and a content of the polylactic acid and the granular bamboo charcoal is regarded as a remaining wt %.

15. The speaker diaphragm according to claim 1, wherein a content of the bamboo fibers is greater than a content of the natural binder.

16. The speaker diaphragm according to claim 1, wherein a glass transition temperature of the starch-based binder is 85° C. to 130° C.

17. The speaker according to claim 7, wherein a glass transition temperature of the starch-based binder is 85° C. to 130° C.

18. The electronic equipment according to claim 13, wherein a glass transition temperature of the starch-based binder is 85° C. to 130° C.

19. The mobile device according to claim 14, wherein a glass transition temperature of the starch-based binder is 85° C. to 130° C.

\* \* \* \* \*